United States Patent [19]
Gibson, Jr.

[11] 3,991,715
[45] Nov. 16, 1976

[54] ATTACHMENT FOR AQUARIUM TANKS

[76] Inventor: Joseph W. Gibson, Jr., 1215 Hillside Blvd., Carrcroft, Wilmington, Del. 19803

[22] Filed: July 1, 1975

[21] Appl. No.: 592,221

[52] U.S. Cl. .................................................. 119/5
[51] Int. Cl.² ...................................... A01K 63/00
[58] Field of Search ............................. 119/5, 3, 15

[56] References Cited
UNITED STATES PATENTS

| | | | |
|---|---|---|---|
| 192,595 | 7/1877 | Palen et al. ........................ | 119/5 X |
| 1,943,417 | 1/1934 | Bringman ............................ | 119/5 |
| 2,652,807 | 9/1953 | Washburn ............................ | 119/3 |
| 3,320,928 | 5/1967 | Smith .................................. | 119/3 |
| 3,687,110 | 8/1972 | Braunhut ............................ | 119/15 |

Primary Examiner—Hugh R. Chamblee

[57] ABSTRACT

A device is provided which provides an extension of the water media above the surface of a fish aquarium so that fish in the aquarium can swim above the surface and provide an increase in entertainment because the fish appears in more detail and in a novel environment. The swimway is suspended by means of a mount which attaches to rods which bridge the top of the aquarium or in another embodiment is a floating mount which holds the swimway above the surface of the aquarium. Filling and mounting of the swimway is particularly easy with the devices described.

7 Claims, 8 Drawing Figures

ATTACHMENT FOR AQUARIUM TANKS

FIELD OF THE INVENTION

This invention relates to an aquarium and particularly to mounts for supporting a swimway or fish bridge above the water surface in an aquarium.

DESCRIPTION OF THE PRIOR ART

Fish bridges and other attachments for aquarium tanks are known and provide a means for holding water above the surface of the water in an aquarium and thereby providing an additional swimming area for the fish in the aquarium. However, they are often difficult to fill or involve rather complex devices for erecting the device above the aquarium surface. U.S. Pat. No. 2,512,678 issued to E. A. Rice involves an aquarium with a hollow handle in which the water media extends up through the handle. Examination of the specification in that patent reveals that the entire aquarium must be immersed in order to fill the hollow handle.

U.S. Pat. No. 1,943,417 to G. W. Bringman involves a rather complex device which is fabricated of metal and glass parts and is, therefore, not completely transparent and involves a special device which allows air to escape from the area to be filled with water prior to its being erected above the surface of the aquarium water. This device can only be installed by lowering it to displace air with water then raising it vertically to the place of attachment to the tank brackets and then attaching to the tank brackets.

U.S. Pat. No. 2,059,927 issued to O. G. Beck described a water passover device which is used merely to transfer fish from one aquarium to another. The device is limited to use between two aquariums ad no means are described for suspending it above the surface of one aquarium for use in that way.

BRIEF SUMMARY OF THE INVENTION

It is an object of this invention to provide a simple, inexpensive and easily manipulated means of suspending a fish swimway above the surface of the water in a fish aquarium. This object is realized in an apparatus which consists of adjustable rods which are extended across the top edges of an aquarium and to which is placed a mounting platform adapted to be mounted upon adjustale rods. These elements provide the platform upon which a reservoir rests after it has been filled. The reservoir is filled by inverting the tubular arch or globe in the aquarium water and allowing the water to displace the air. Atmospheric pressure forces the water to remain in the arch or globe.

In another embodiment the mounting platform and the reservoir are combined with two aquariums wherein the mounting block is set between two aquariums by means of transverse grooves which engage the top edges of the aquariums. Thereafter, the reservoir is filled and placed in position so that it connects two aquariums.

In another embodiment the mounting block is a floating platform which has an opening which receives the open ends of the tubular arch or globe reservoirs. The reservoir is usually filled by submerging the reservoir with the openings facing upward so that air is displaced by water, then turning them into their normal position with the openings downward and allowing the entire apparatus to float. Of course, the reservoir may be filled separately and then placed on the mounting block thereafter so long as the openings to the reservoir are not allowed to be raised above the surface of the aquarium.

Figure 1:
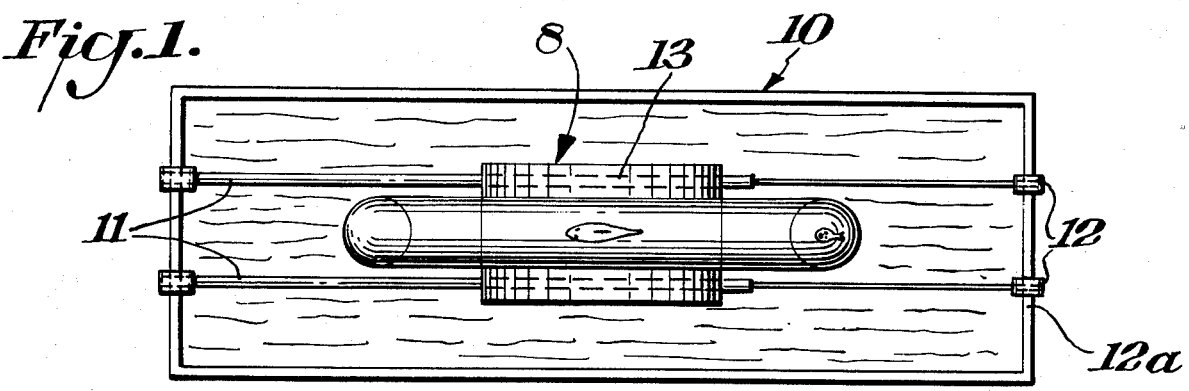
FIG. 1 is a top plan view of the invention attached to an aquarium.
Figure 2:
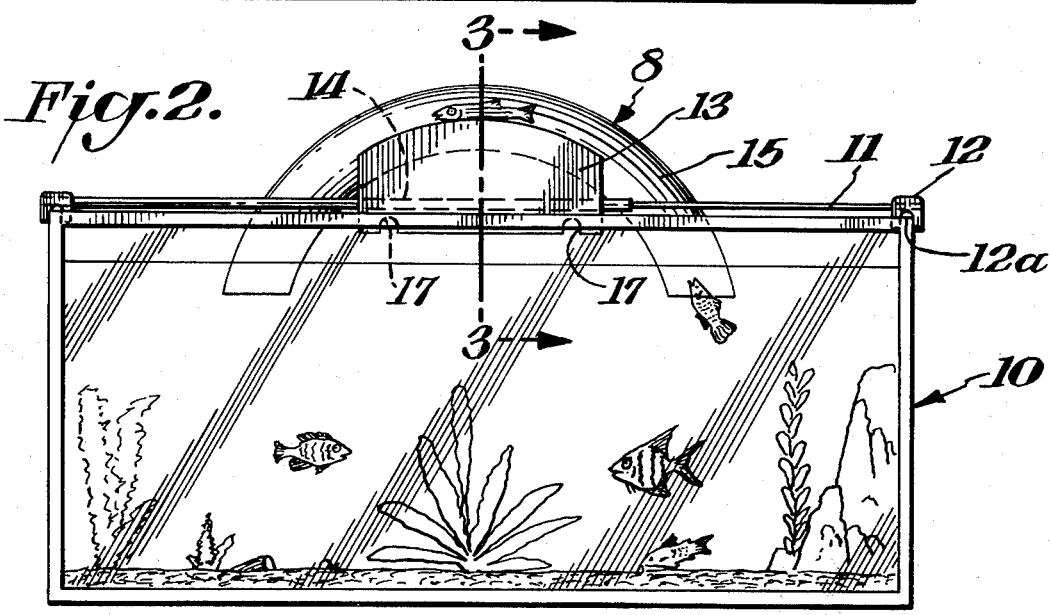
FIG. 2 is a side elevation of the aquarium showing the tubular arch reservoir in place.
Figure 3:
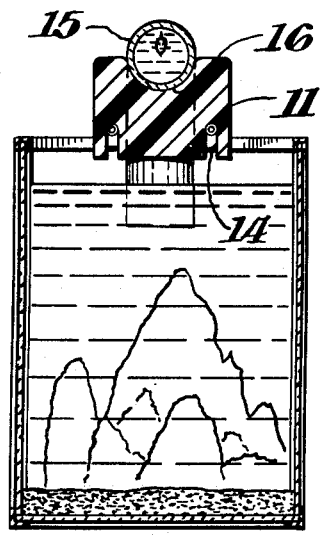
FIG. 3 is a vertical sectional view of the aquarium and the mounting block along the line 3—3.

Referring in greater detail to the drawings particularly FIGS. 1 – 3, a swimway 8 mounted on an aquarium 10 has two adjustable rods 11 having C-shaped plastic blocks 12 on each end of the adjustable rods 11. The adjustable rods 11 are extended so that the C-shaped plastic block 12 rests on the top edges 12a of the aquarium. A mounting block 13 having longitudinal grooves 14 and transverse grooves 17 in the underside of the mounting blocks is mounted on the adjustable rods 11 by fitting the longitudinal grooves 14 to the rods. A tubular arch reservoir 15 is cradled in a shallow trough 16 along the top side of the mounting block 13.

Figure 4:
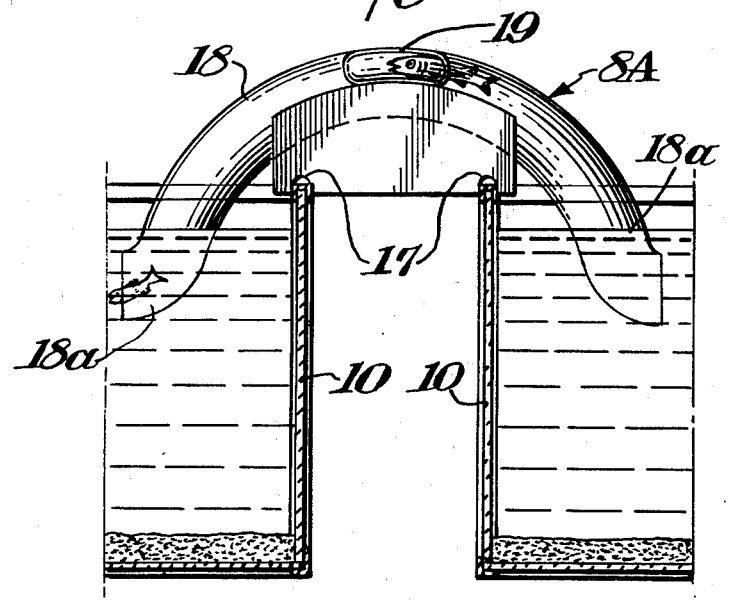
FIG. 4 is a side elevational view showing two aquariums connected by a tubular arch reservoir with the mounting block positioned between two aquariums.

FIG. 4 shows a modified swimway 8a having the mounting block 13 positioned between two aquariums by means of the transverse grooves 17 each of which engage the top edge of an aquarium. FIG. 4 also shows a different tubular arch reservoir 18 wherein the ends of the swimway 18a are extended so that the opening to the reservoir is vertically aligned and also contains a magnifying glass section 19.

Figure 5:
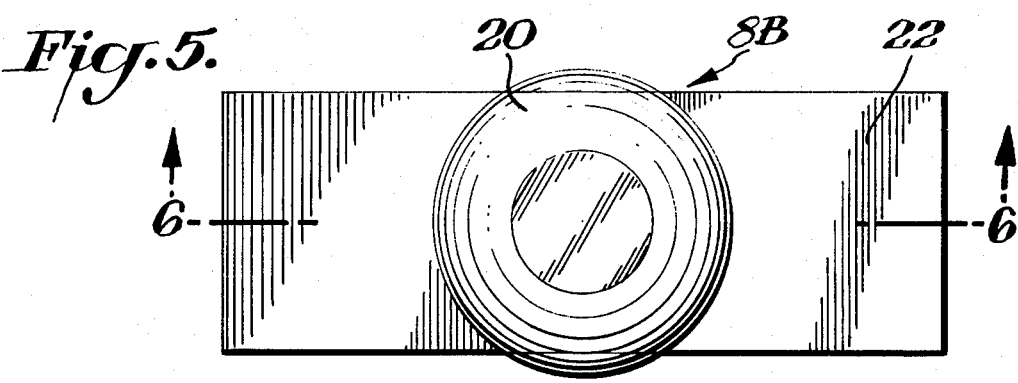
FIG. 5 is a top plan view of a floating swimway with a globular reservoir.
Figure 6:
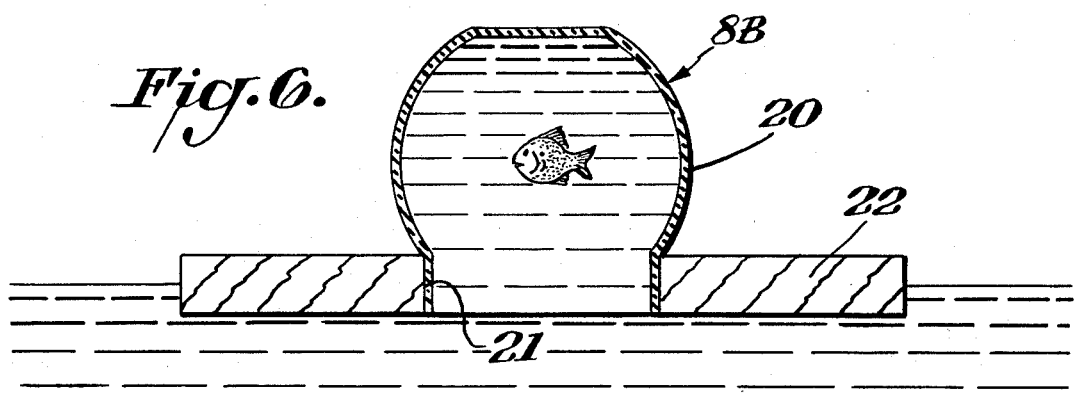
FIG. 6 is a sectional view of FIG. 5 along the line 6—6.

FIG. 5 and FIG. 6 shows another modified swimway 8b having a globular reservoir 20 which is held in the opening 21 of a floating rectangular platform 22.

Figure 7:
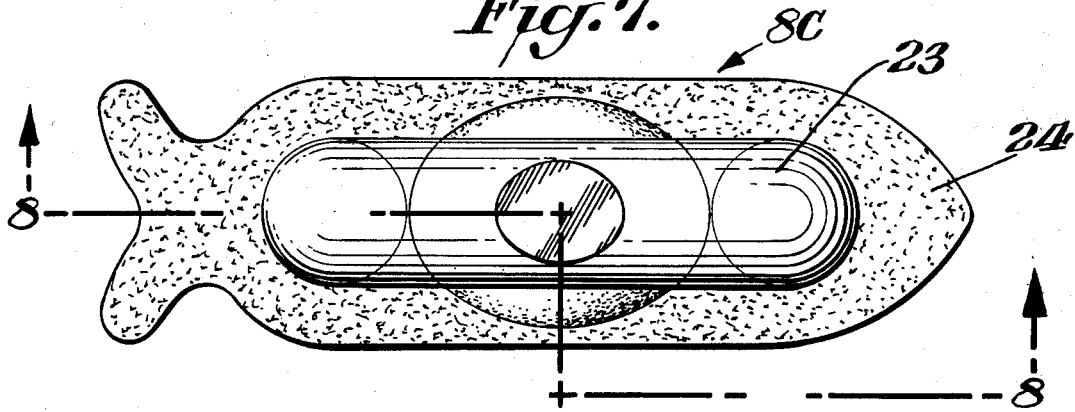
FIG. 7 is a top plan view of a floating tubular arch reservoir.
Figure 8:
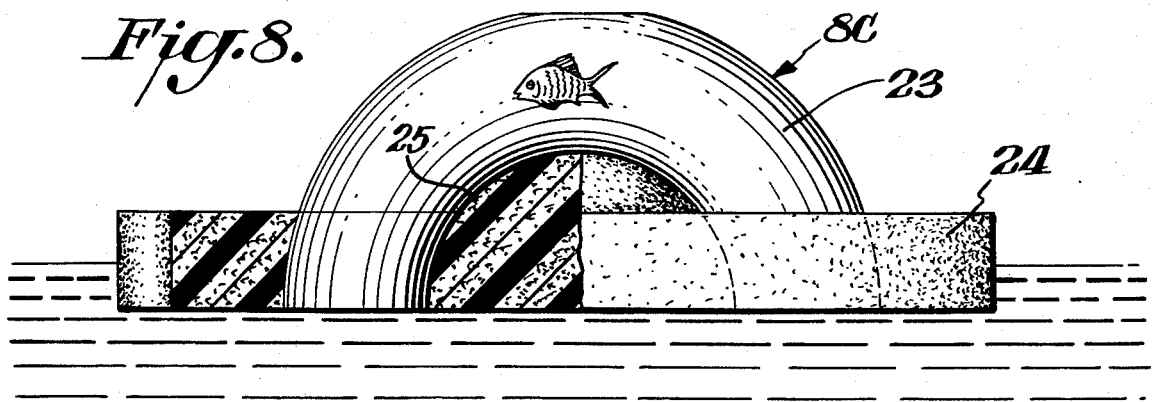
FIG. 8 is an elevational view of FIG. 7 along the line 8—8.

FIG. 7 and FIG. 8 shows still another modified swimway 8c having a tubular arch reservoir 23 mounted in a floating platform 24. The swimway is supported by a mounting block 25 which is a part of the floating platform 24.

DETAILED DESCRIPTION OF THE INVENTION

The swimway is a means of greatly enhancing the pleasure to be derived from an aquarium. The instant device has advantages over the prior art devices in that it is easily mounted on an aquarium of any size or shape merely by spacing the adjustable rods across the top either the length or the width of the aquarium, filling the reservoir, raising the reservoir between the adjustable rods and inserting a mounting block on the rods and resting the reservoir on the mounting block. The mounting block grooves engage the adjustable rods. The reservoir is seated in the shallow trough or saddle of the mounting block. Occasionally it may be necessary to move the swimway to one side of the aquarium in order to make modifications to the aquarium or to install equipment. In contrast to the devices in the prior art, this invention is easily moved to one side of the aquarium by sliding the device on its C-shaped blocks which are on the edges of the aquarium. The opening of the reservoir must be kept below the surface of the water at all times. Otherwise, air will leak into the reservoir and cause the water to run out.

This embodiment of the invention is shown with adjustable rods. However, rods which are not adjustable may also be used.

The shape of the reservoir is tubular or globular in the preferred embodiments. Other shapes may also be accomodated within the purview of this invention.

The diameter of the tubular arch reservoir is usually constant throughout the entire arch although the arch can have different diameters at intervals along its length. However, the diameter must be large enough to allow fish to pass through the arch.

The floating swimways are particularly easy to use and involve simple immersing of the entire apparatus below the surface of the water upside down and then turning it over while underwater and allowing the entire apparatus to rise to the surface of the aquarium. The buoyancy of the floating block must be sufficient to bear the weight of the water contained in the reservoir and to maintain the openings of the reservoirs below the surface of the aquarium water. Maintaining the openings of the reservoir below the water surface is usually achieved by extending the lips of the openings so they are at least flush with the bottom surface of the floating block. The lips can, of course, protrude further into the water. The floating swimways may be used on any body of water including indoor and outdoor ponds.

The floating swimways must be made of wood or foamed plastic or any other material which will float and displace enough water to bear the weight of the reservoir. If the embodiment which is mounted on the adjustable rods is desired, it may be manufactured of nonbuoyant materials. It is, of course, possible to have a mounting block which is adapted to the adjustable rods which is also buoyant and can be used in a floating embodiment.

The reservoirs may be manufactured of transparent material, either glass or water resistant plastics. They may also be tinted any desired color.

These swimways provide both entertainment and education. The fact that the fish have a media in which to pass above the surface of the aquarium provides a visual spectacle which is novel and enjoyable to the viewer and allows closer examination of swimming species and an opportunity to learn about their behavior. The swimway shown in FIG. 4 has some aspects of it which are particularly useful. The fact that the ends of the tubular arch reservoir are turned so that they do not face the bottom of the aquarium prevents the passage of air or gases generated in the aquarium from passing into the tubular arch reservoir. The opening of the tubular arch reservoir may be extended so that it is perpendicular to the surface or even facing the surface of the aquarium. However, this feature does not prevent the fish from entering or passing through the swimway in any way. The magnifying section also shown in FIG. 4 provides a means of heightening the amount of detail that one can see when observing the fish. The fish in the normal course of swimming will swim near the magnifying glass and an observer can see the details of their markings and colorings in greater detail.

I claim:

1. A floating fish swimway which comprises in combination with a filled aquarium:
   a. a transparent reservoir filled with water having an opening of a size sufficient for fish, said opening being in a normally downward position and having a protruding lip; and
   b. a buoyant support member having means for receiving the portruding lip of the transparent reservoir whereby the lip is below the surface of the aquarium water.

2. A swimway as in claim 1 wherein the reservoir is globe shaped.

3. A swimway as in claim 1 wherein the reservoir is a tubular arch having two openings and the buoyant support member has two openings adapted to receive the two openings of the tubular arch.

4. A swimway as in claim 1 wherein the buoyant member is shaped from wood.

5. A swimway as in claim 1 wherein the buoyant member is shaped from foam polystyrene.

6. A fish swimway which comprises, in combination with an aquarium:
   a. A pair of adjustable rods having means at each end of the rods for attaching the rods to the top edge of the aquarium;
   b. A transparent tubular arch reservoir filled with water wherein the ends of the tubular arch extend below the surface of the water in the aquarium, the plane of each of the openings in each end of the tubular arch are at least at a right angle with the surface of the water and wherein the diameter of the tubular arch is sufficiently large for fish to pass through; and
   c. Mounting means for supporting the tubular arch on the adjustable rods.

7. A fish swimway which comprises, in combination with an aquarium:
   a. A pair of adjustable rods having means at each end of the rods for attaching the rods to the top edge of the aquarium;
   b. A transparent tubular arch reservoir having downwardly facing open ends of a size sufficient for fish to pass through said ends being below the surface of the water in the aquarium; and
   c. Mounting means for supporting the tubular arch reservoir upon the pair of adjustable rods attached to the top edge of the aquarium wherein the mounting means has two faces with parallel grooves on one face, said grooves separated a space greater than the diameter of the tube of the tubular arch reservoir and having a trough on the face opposite the face having grooves said trough being adapted to receive the tubular arch reservoir.

* * * * *